United States Patent [19]

Douglas

[11] Patent Number: 5,105,501
[45] Date of Patent: Apr. 21, 1992

[54] VEHICULAR WINDSHIELD DEFOGGING APPARATUS

[76] Inventor: O'Keefe Douglas, Box 478, Manchester, Jamaica

[21] Appl. No.: 657,521

[22] Filed: Feb. 19, 1991

[51] Int. Cl.⁵ .............................................. B60S 1/30
[52] U.S. Cl. ................................ 15/250.28; 15/250.35
[58] Field of Search .......... 15/250.28, 250 R, 250.30, 15/250.35, 250.34, 250 C, 250.40

[56] References Cited

U.S. PATENT DOCUMENTS

| | | | |
|---|---|---|---|
| 1,562,017 | 11/1925 | Littrow | 15/250.28 |
| 1,739,411 | 12/1929 | Murphy | 15/250.28 |
| 1,860,281 | 5/1932 | Gentil | 15/250.28 |
| 2,031,297 | 2/1936 | Anderson | 15/250.30 |
| 2,805,438 | 9/1957 | Hogensen | 15/250.28 |
| 2,879,535 | 3/1959 | Del Cerro | 15/250.28 |
| 3,027,586 | 4/1962 | Hirsch | 15/250 R |
| 3,108,307 | 10/1963 | Redrow | 15/250.28 |
| 3,448,480 | 6/1969 | Couget | 15/250.30 |
| 3,978,542 | 9/1976 | van Eekelen et al. | 15/250.30 |
| 4,023,422 | 5/1977 | Jou et al. | 15/250.28 |

FOREIGN PATENT DOCUMENTS

| | | | |
|---|---|---|---|
| 1288099 | 2/1962 | France | 15/250.28 |
| 559923 | 3/1957 | Italy | 15/250.28 |

Primary Examiner—Harvey C. Hornsby
Assistant Examiner—Gary K. Graham
Attorney, Agent, or Firm—Leon Gilden

[57] ABSTRACT

An apparatus for mechanically defogging an interior surface of a windshield in a mirror image oscillation with conventional vehicular windshield structure is provided, wherein the windshield organization of the invention includes an electro-magnetic member cooperative with a further member mounted upon the vehicular windshield to effect movement in a complementary and aligned manner of the defogging windshield with the vehicular windshield. The defogging windshield wiper structure is pivotally mounted utilizing a suction cup organization to an interior surface of the windshield adjacent the vehicular windshield and includes a flexible rod maintained in contact with the interior surface of the windshield by a rigid post overlying the flexible rod, with repelling magnet members mounted upon the flexible rod and rigid post to maintain the effect of the defogging windshield wiper with the vehicular windshield interior surface.

3 Claims, 5 Drawing Sheets

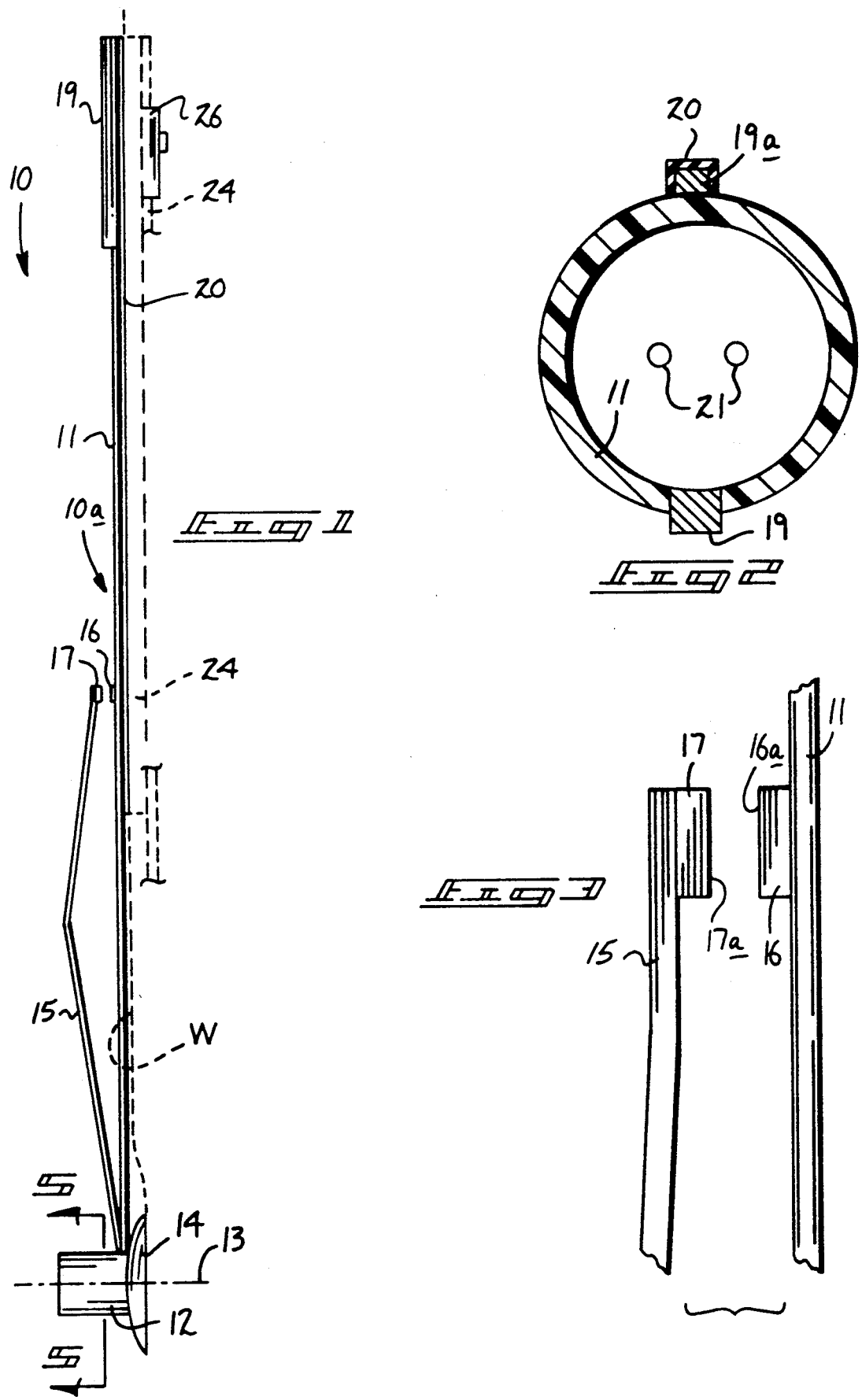

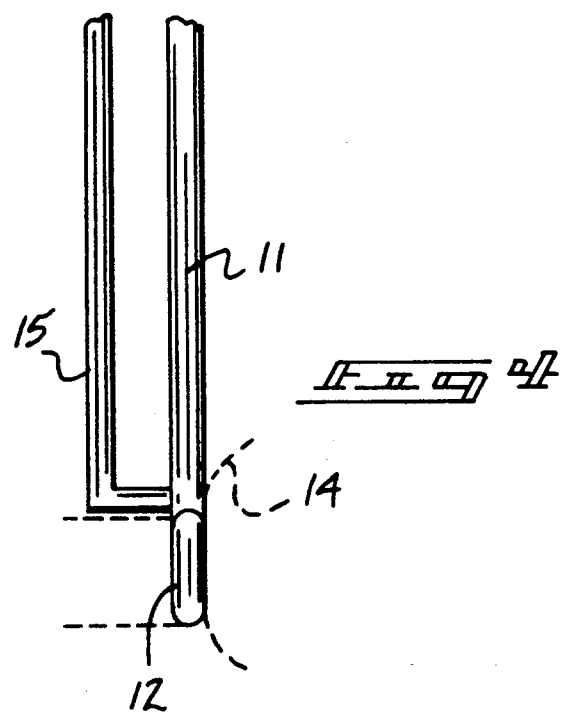
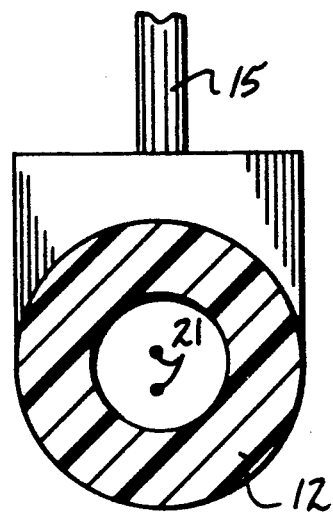

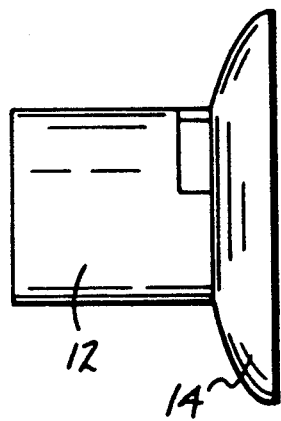
FIG 6
FIG 7
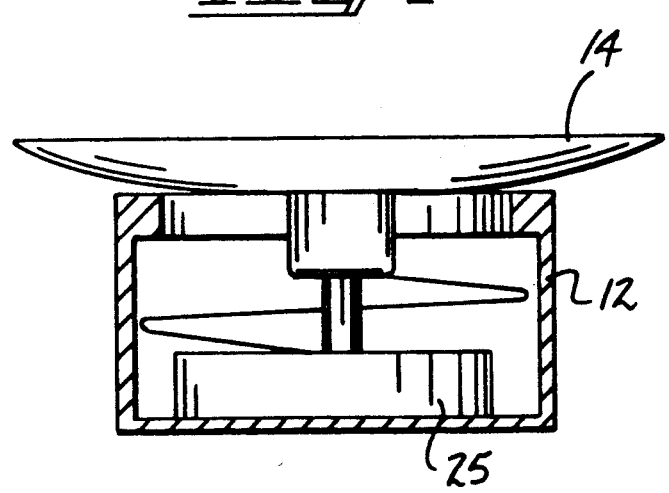

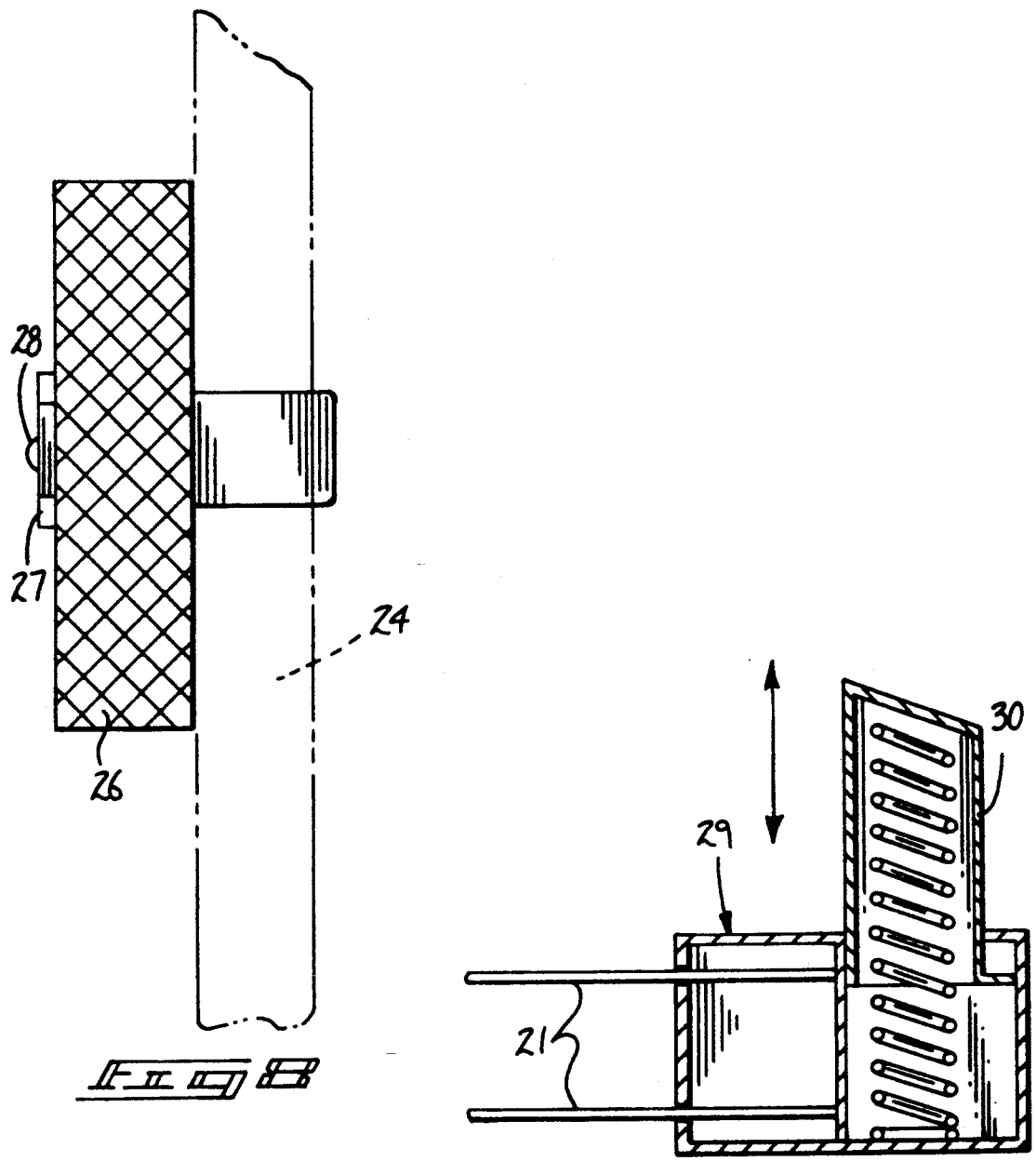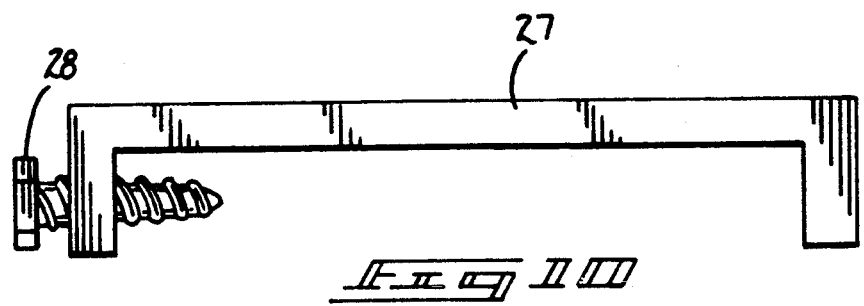

VEHICULAR WINDSHIELD DEFOGGING APPARATUS

BACKGROUND OF THE INVENTION

1. Field of the Invention

The field of invention relates to a vehicular windshield apparatus, and more particularly pertains to a new and improved vehicular windshield defogging apparatus wherein the same is arranged to effect complementary oscillation causing magnetic attraction between an associated vehicular windshield and the defogging windshield of the instant invention.

2. Description of the Prior Art

During driving in various moisture laden environments, vehicular windshields are frequently fogged on an interior surface thereof. Prior art structure, to accommodate such defogging, may include U.S. Pat. No. 3,936,901 to Theckston a heating element imbedded within the wiper blade.

U.S. Pat. No. 4,497,083 to Nielsen, Jr., et al. sets forth a vehicular windshield wiper utilizing a resistance heating wire directed therewithin.

U.S. Pat. No. 4,360,941 to Mabie sets forth a further example of electrically heated windshield wiper, as well as the U.S. Pat. No. 4,603,451 to the inventor VanSickle utilizing heated windshield wiper assemblies.

The instant invention accordingly attempts to overcome the problems of ease of use as well as effectiveness in construction in providing wiping of an interior surface of a windshield in cooperation with a vehicular windshield wiper arm and in this respect, the present invention substantially fulfills this need.

SUMMARY OF THE INVENTION

In view of the foregoing disadvantages inherent in the known types of vehicular windshield wiper structure now present in the prior art, the present invention provides a vehicular windshield defogging apparatus wherein the same utilizes a mechanical wiper blade mounted interiorly of a vehicular windshield to cooperate with magnetic attraction with the windshield wiper to maintain visibility to an existing vehicular windshield. As such, the general purpose of the present invention, which will be described subsequently in greater detail, is to provide a new and improved vehicular windshield defogging apparatus which has all the advantages of the prior art vehicular windshield wiper apparatus and none of the disadvantages.

To attain this, the present invention provides an apparatus for mechanically defogging an interior surface of a windshield in a mirror image oscillation with conventional vehicular windshield structure is provided, wherein the windshield organization of the invention includes an electro-magnetic member cooperative with a further member mounted upon the vehicular windshield to effect movement in a complementary and aligned manner of the defogging windshield with the vehicular windshield. The defogging windshield wiper structure is pivotally mounted utilizing a suction cup organization to an interior surface of the windshield adjacent the vehicular windshield and includes a flexible rod maintained in contact with the interior surface of the windshield by a rigid post overlying the flexible rod, with repelling magnet members mounted upon the flexible rod and rigid post to maintain the effect of the defogging windshield wiper with the vehicular windshield interior surface.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular windshield defogging apparatus which has all the advantages of the prior art vehicular windshield wiper structures and none of the disadvantages.

It is another object of the present invention to provide a new and improved vehicular windshield defogging apparatus which may be easily and efficiently manufactured and marketed.

It is a further object of the present invention to provide a new and improved vehicular windshield defogging apparatus which is of a durable and reliable construction.

An even further object of the present invention is to provide a new and improved vehicular windshield defogging apparatus which is susceptible of a low cost of manufacture with regard to both materials and labor, and which accordingly is then susceptible of low prices of sale to the consuming public, thereby making such vehicular windshield defogging apparatus economically available to the buying public.

Still yet another object of the present invention is to provide a new and improved vehicular windshield defogging apparatus which provides in the apparatuses and methods of the prior art some of the advantages thereof, while simultaneously overcoming some of the disadvantages normally associated therewith.

Still another object of the present invention is to provide a new and improved vehicular windshield defogging apparatus wherein the same is arranged for convenience of retrofit relative to an existing windshield wiper structure permitting mounting of a magnetic member upon an existing windshield wiper to cooperate with the defogging wiper arm of the instant invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view, taken in elevation, of the defogging wiper arm of the instant invention cooperating with the conventional wiper arm of a vehicular windshield.

FIG. 2 is an orthographic cross-sectional illustration of the flexible post mounting the electro-magnetic member of the instant invention.

FIG. 3 is an orthographic side view of the rigid post and flexible post mounting repelling magnetic members to direct the flexible post against an interior surface of an associated windshield.

FIG. 4 is an orthographic side view of the swivel base mounting the flexible and rigid post.

FIG. 5 is an orthographic top view, partially in section, of the swivel base utilized by the instant invention.

FIG. 6 is an orthographic side view of the swivel base utilized by the instant invention.

FIG. 7 is an orthographic view, partially in section, of the suction cup mounted within the swivel base of the instant invention.

FIG. 8 is an orthographic side view illustrating the wiper arm magnet mounted to an associated windshield wiper arm for positioning adjacent an exterior surface of the associated vehicular windshield.

FIG. 9 is an orthographic side view of the mounting plate utilized to mount the wiper arm magnet to the associated windshield wiper arm as set forth in FIG. 8.

FIG. 10 is illustrative of an on/off switch utilized by the instant invention.

DESCRIPTION OF THE PREFERRED EMBODIMENT

Figure 11:
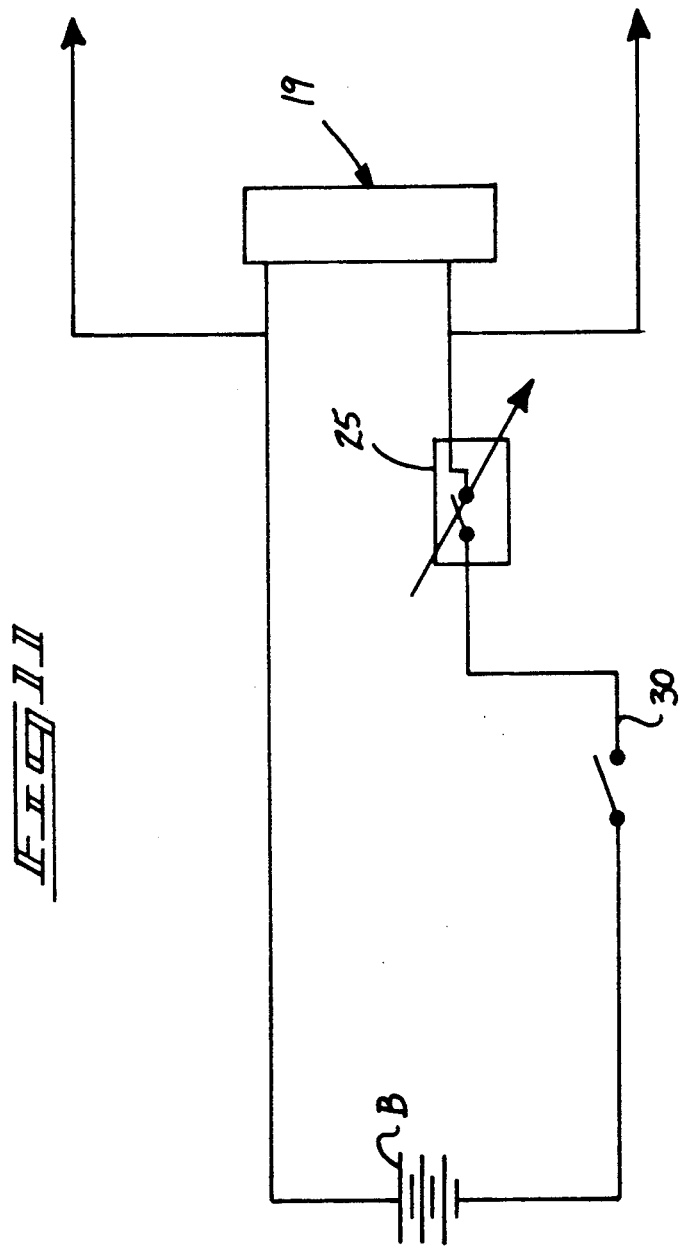
FIG. 11 is a schematic electrical illustration of a typical structure utilized by the instant invention.

With reference now to the drawings, and in particular to FIGS. 1 to 14 thereof, a new and improved vehicular windshield defogging apparatus embodying the principles and concepts of the present invention and generally designated by the reference numeral 10 will be described.

More specifically, the vehicular windshield defogging apparatus 10 of the instant invention essentially comprises a defogging wiper arm 10a pivotally mounted to an interior surface of an associated windshield "W" cooperating with an exterior windshield wiper arm 24 of conventional construction pivotally mounted to an exterior surface of the windshield "W", wherein the windshield "W" is of conventional construction utilized in self-propelled vehicles. The defogging wiper arm 10a includes a swivel base 12 defined along a swivel base axis 13. The swivel base 12 includes a suction cup mounting member 14 coaxially mounted to a lower terminal end of the base 12 to effect coupling to the interior surface of the windshield "W". A rigid post 15 is directed radially and exteriorly of the base 12 and extends in parallel alignment with the exterior windshield wiper arm 24. The flexible post 11 mounts an elongate electro-magnetic first portion 19 diametrically opposed to and in cooperation with an electro-magnetic second portion 19a. The electro-magnetic second portion 19a includes a resilient covering 20 to prevent marring of the interior surface of the windshield "W" when the second portion 19a is directed thereover in use. A rigid post 15 is fixedly mounted to the swivel base 12 overlying the flexible post 11. The flexible post 11, it should be noted, is formed of a memory retentent material to accommodate various deflections and deviations of the interior windshield surface in use. The rigid post 15 mounts a first ferro-magnet member 16 at a remote terminal end thereof spaced from the swivel base 12, wherein the first ferro-magnet 16 has an exposed face 16a of a first polarity in confronting relationship to a second magnet 17, with an exposed face 17a of a like first polarity. The exposed first magnetic face 16a is in confronting relationship relative to the opposed second magnetic face 17a and of a like polarity to impart a repelling force to the flexible post 11 to direct the post in contact with the interior surface of the windshield "W" as illustrated. Reference to FIG. 2 illustrates the use of electrical transmission wires 21 directed through the flexible post 11 to direct electrical current to the electro-magnetic second portion 19a. The exterior windshield wiper arm 24 includes a wiper arm magnet 26, wherein a wiper arm magnet "U" shaped mounting clip 27 mounts the wiper arm magnet 26 to the exterior wiper arm 24 utilizing a threaded securement fastener 28 directed through a leg of the "U" shaped mounting clip 27 for embedding within the windshield wiper arm 24 orthogonally thereto to position the wiper arm magnet 26. The wiper arm magnet 26 and the electro-magnetic second portion 19a of opposed polarity to effect attraction between the second magnetic portion 19a and the wiper arm magnet 26, whereupon oscillation of the exterior wiper arm 24 effects attraction to the flexible post 11 and its associated electro-magnetic second portion 19a to thereby oscillate the defogging wiper 10a complementarily with the exterior windshield wiper arm 24.

FIG. 9 illustrates the swivel base 12, including a timer device 25 mounted therewithin cooperating with a switch 29 utilizing an on/off button member 30, wherein the timer device is utilized to impart timed oscillation of the defogging wiper arm 10a with the exterior windshield wiper arm 24 to avoid overheating of the flexible post 11, if desired.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular windshield defogging apparatus comprising,
    a defogging wiper arm in combination with and mounted to an interior surface of a vehicular windshield and longitudinally aligned with an exterior windshield wiper arm mounted to overlie an exterior surface of the vehicular windshield, wherein the defogging arm includes an elongate flexible post formed of a memory retentent material including a swivel base at one end, the swivel base defined about a central swivel base axis, and a suction cup mounting member mounted to a lower terminal end of the swivel base coaxially aligned along the swivel base axis to connect the swivel base to the interior surface and support the swivel base for swivelling movement, and
    the flexible post including an electro-magnet means mounted adjacent a remote terminal end of the flexible post with respect to said base, and
    a wiper arm magnet mounted to the exterior windshield wiper arm magnetically attracted to the electro-magnetic means for effecting simultaneous oscillation of the defogging wiping arm upon oscillation of the exterior windshield wiper arm, and
    wherein the electro-magnetic means includes an electro-magnetic first portion and and electro-magnetic second portion, with the electro-magnetic second portion lying along said defogging wiper arm in close proximity to said interior surface, said second portion including a resilient covering coextensive therewith to prevent marring of the interior surface of the windshield by said second portion, said covering being in contiguous communication with the interior surface of the windshield, and
    including a rigid post extending overlying the flexible post and fixedly mounted at one end to the swivel base, the rigid post including a first ferro-magnetic member mounted to the other end thereof, and a second ferro-magnetic member mounted to the flexible post, with the first ferro-magnetic member located at a distance from the swivel base equal to a distance from the swivel base to the second ferro-magnetic member, with the first ferro-magnetic member including an exposed first face defined by a first polarity, wherein the second ferro-magnet includes an exposed second face defined by the first polarity to effect magnetic repulsion of the first ferro-magnetic member with the second ferro-magnetic member and impart the flexible post in communication with the interior surface of the windshield.

2. An apparatus as set forth in claim 1 wherein the wiper arm magnet includes a wiper arm magnet "U" shaped mounting clip, with the "U" shaped mounting clip including a threaded securement fastener directed through the "U" shaped mounting clip in contiguous communication with an exterior surface of the exterior windshield wiper arm to secure the wiper arm magnet to the exterior windshield wiper arm.

3. An apparatus as set forth in claim 2 wherein the swivel base includes a timer device mounted therewithin to selectively discontinue electrical energy directed to the electro-magnetic means to impart selective oscillation of the defogging wiper arm with the exterior windshield wiper arm.

* * * * *